United States Patent [19]
Billet et al.

[11] Patent Number: 5,810,140
[45] Date of Patent: Sep. 22, 1998

[54] LOCKING CLUTCH, NOTABLY FOR MOTOR VEHICLES

[75] Inventors: René Billet, Lamorlaye; Pascal Annic, Saint-Herblain, both of France

[73] Assignee: Valeo, Paris, France

[21] Appl. No.: 596,281

[22] PCT Filed: Jun. 8, 1995

[86] PCT No.: PCT/FR95/00750

§ 371 Date: Mar. 6, 1996

§ 102(e) Date: Mar. 6, 1996

[87] PCT Pub. No.: WO95/33937

PCT Pub. Date: Dec. 14, 1995

[30] Foreign Application Priority Data

Jun. 8, 1994 [FR] France ................................... 94.07215

[51] Int. Cl.$^6$ ................................................ F16H 45/02
[52] U.S. Cl. .......................................... 192/3.29; 192/205
[58] Field of Search ........................... 192/3.29, 110 R, 192/205, 213, 3.28; 464/66, 67

[56] References Cited

U.S. PATENT DOCUMENTS

| | | | |
|---|---|---|---|
| 2,158,244 | 5/1939 | Mistretta et al. | ...................... 464/66 X |
| 4,274,519 | 6/1981 | Moroto et al. | . |
| 4,875,562 | 10/1989 | Fujimoto | . |
| 4,890,706 | 1/1990 | Miura et al. | ........................ 192/3.29 X |
| 5,020,647 | 6/1991 | Fujimoto et al. | ....................... 192/3.29 |
| 5,105,921 | 4/1992 | Fujimoto | . |
| 5,447,218 | 9/1995 | Tauvron | ............................... 192/110 R |

FOREIGN PATENT DOCUMENTS

| | | |
|---|---|---|
| 0240166 | 10/1987 | European Pat. Off. . |
| 2488362 | 12/1982 | France . |
| 2674306 | 9/1992 | France . |
| 2123924 | 2/1984 | United Kingdom . |

*Primary Examiner*—Rodney H. Bonck
*Attorney, Agent, or Firm*—Longacre & White

[57] ABSTRACT

A locking clutch includes a torsion damper (20) and a piston (21), the torsion damper (20) having an inlet part (40) fixed to the piston (21) and an outlet part (60, 160, 260). The web has support portions (65) for the circumferential ends of springs (50, 52, 53) acting between the inlet parts (40) and outlet parts (60, 160, 260). The inlet part (40) of the torsion damper (20) consists of a plurality of guidance plates (40) fixed to the piston (21). Each plate (40) has a central part (47) and two lateral wings (49) to define holding portions (41) for the springs (50, 52, 53) and support portions (45, 145) for the springs (50, 52, 53). The piston (21) has at its external periphery an axially oriented annular shoulder (28) shaped so as to retain the springs (50, 52, 53).

13 Claims, 6 Drawing Sheets

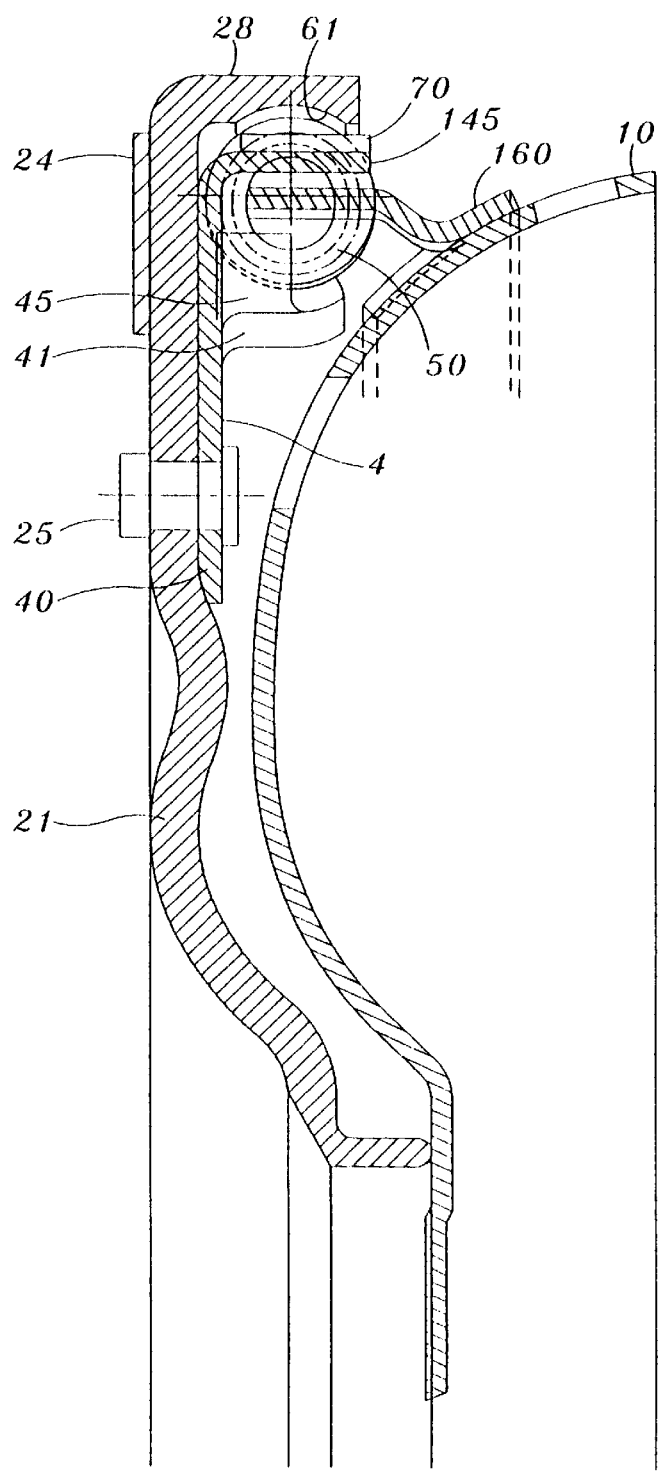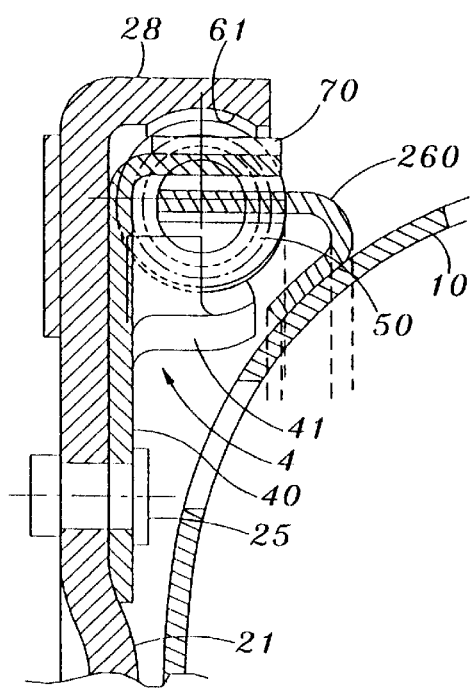

LOCKING CLUTCH, NOTABLY FOR MOTOR VEHICLES

BACKGROUND OF THE INVENTION

1. Field of the Invention

The present invention concerns locking clutches, notably for motor vehicles, operating between the casing and the turbine wheel of a hydrokinetic coupling mechanism.

2. Description of the Prior Art

Such a clutch is described for example in the document FR-A-2 488 362. In the latter the clutch includes a torsion damper, a piston mounted so as to be able to move axially and at least one friction lining associated with the piston and able to be clamped between the said piston and a counter-piston formed in this case by a transverse wall of the casing.

The torsion damper has an inlet part and an outlet part and springs interposed circumferentially between the said inlet and outlet parts in order to connect them.

This damper is positioned at the external periphery of the casing and thus has two coaxial parts mounted so as to move with respect to each other counter to circumferentially acting springs, namely an inlet part provided with a continuous-guidance washer and an outlet part provided with a web.

The guidance washer is fixed to the piston and the web is joined to the turbine wheel.

The guidance washer has a U-shaped profile to guide springs radially internally and externally. Moreover this guidance washer has stops or support portions, radially offset, to cooperate with the circumferential ends of the springs to immobilise the latter in the peripheral direction. The web has support portions in the form of lugs to support the springs.

As a result the guidance washer has a complicated shape and is difficult to produce on a press.

In FIG. 5 of the document U.S. Pat. No. 4,875,562 the inlet part of the torsion damper consists of a plurality of guidance plates attached fixedly to the piston of the locking clutch, each guidance plate having two lateral wings and a central section projecting radially with respect to the said wings and inserted between the circumferential ends of two consecutive springs.

In this embodiment each lateral wing has a holding portion to hold the springs radially on the inside and the piston is provided on its external periphery with an axially orientated annular shoulder shaped to retain the springs radially on the outside. This piston has the projections for supporting the springs.

In practice each lateral wing is extended circumferentially in order to have a second central part. As a result a great deal of material is used and there are difficulties in fitting the plates. Moreover, the piston does not have a simple shape.

The object of the present invention is to reduce these drawbacks and therefore to create a simplified locking clutch which is easy to manufacture.

SUMMARY OF THE INVENTION

According to the invention a locking clutch of the above-mentioned type is characterised in that each lateral wing has a second support portion extending its holding portions to give support to the relevant circumferential end of the springs, in that the central part has a first support portion, offset radially towards the outside with respect to the second support portions, to provide a support for the facing circumferential ends of consecutive springs.

By virtue of the invention the guidance plates have a simple shape because they do not have to retain the springs on the outside, and the piston has a simpler shape because it is the support plate which has a first support portion for the springs.

These plates are easy to make by cutting and bending on a press. The piston also has a simple shape and is stiffened by its shoulder. This shoulder enables the springs to be held without having to provide supports for them. This piston is therefore easy to manufacture.

Moreover, because of the plates, a saving is made in material, since they act as simple shims between two facing circumferential ends of two consecutive springs.

In addition, by virtue of the invention, balancing plates can be interposed radially between the shoulder of the piston and the first support portions of the guidance plates.

Advantageously, to do this, the first support portions have, circumferentially at their end, deformations, such as protrusions, to retain the balancing plates circumferentially.

In one embodiment these plates have a projecting area able to enter a hollow provided in the piston shoulder to retain the springs radially on the outside.

Thus the fitting of the balancing plates is effected simply by. snapping in.

The following description illustrates the invention with regard to the accompanying drawings in which:

BRIEF DESCRIPTION OF THE DRAWINGS

FIG. 4 is a view in section along the line 4—4 in FIG. 2;

FIG. 8 is a view analogous to FIG. 4 for another example embodiment.

DETAILED DESCRIPTION OF THE PREFERRED EMBODIMENT

Figure 1:
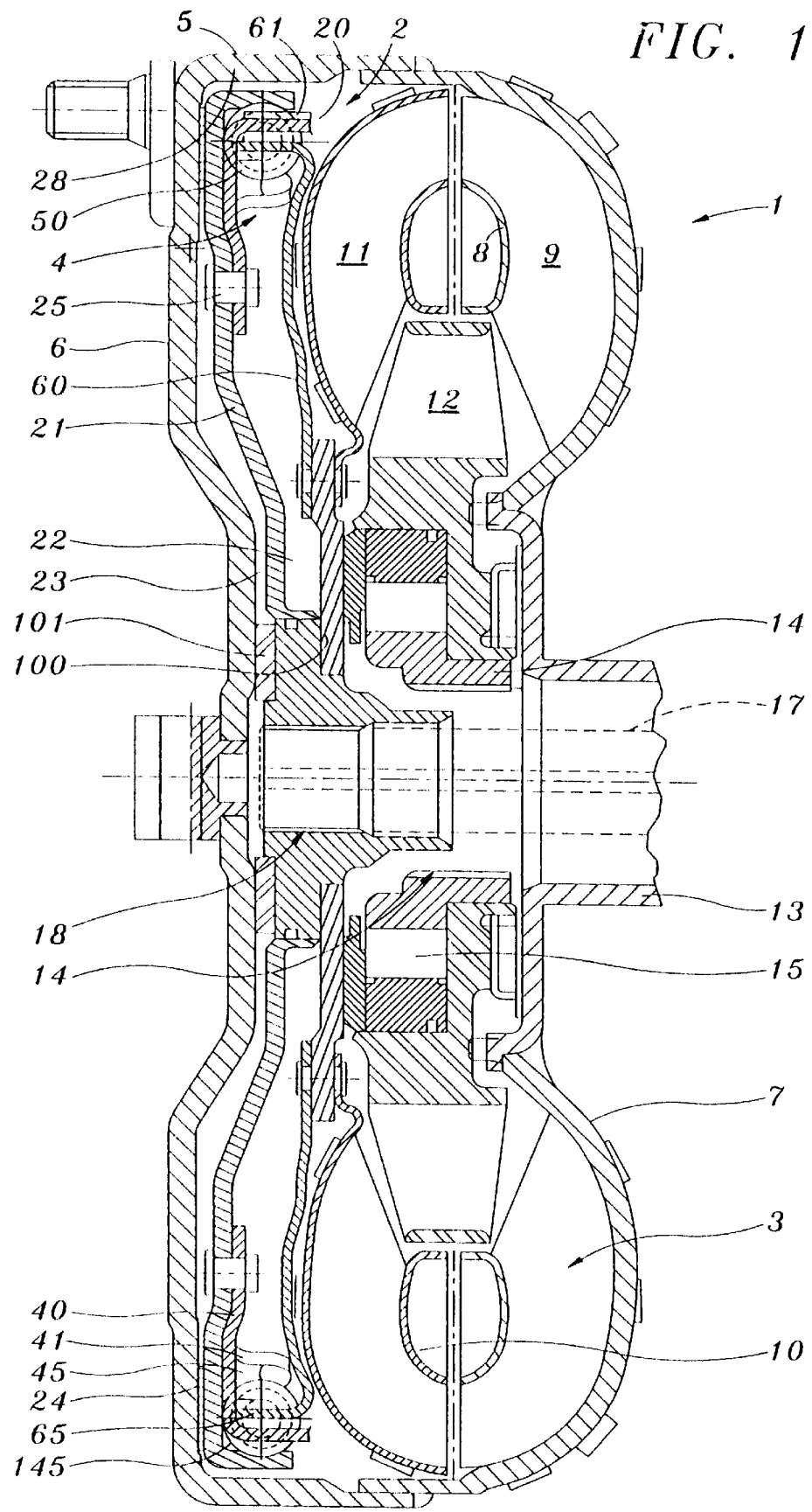
FIG. 1 is a view in axial section of a hydrokinetic coupling mechanism provided with a locking clutch according to the invention.

In the illustrated figures the locking clutch according to the invention is mounted in a hydrokinetic coupling mechanism 1. This mechanism 1 (FIG. 1) has, arranged in a single sealed casing 2 forming an oil sump, a torque converter 3 and a locking clutch 4. The casing 2 forms a driving element and can be rotationally connected to the crankshaft of the internal combustion engine of the motor vehicle.

This casing 2, annular in shape, is composed of a first shell 5, having an annular transverse wall 6, and a second shell 7 facing the first shell 5 and shaped so as to define an impeller wheel 8 with blades 9.

The blades 9 are joined, here by clamping, to the internal face of the second shell 7.

The shells 5, 7 are connected to each other sealingly, in this case by welding, at their external periphery, and the wall 6 has at its centre a centrer and at its periphery threaded parts for rotationally joining the casing 2 to the crankshaft. The rest of the torque converter comprises a turbine wheel 10 provided with blades 11, clamped onto it, facing the blades 9 and a reactor wheel 12.

The turbine wheel 10 is rotationally connected to a driven shaft 17 (the input shaft of a gearbox), being here fixed to a central hub 18 by means of a plate 100 (FIG. 1).

The hub 18 is rotationally coupled to the driven shaft 17 by a fluted mounting, whereas the reactor wheel 12 is connected to a sleeve 14 with the intervention of a free wheel 15.

The sleeve 14 is rotationally fixed to a fixed shaft (not visible) forming a reaction sleeve by means of a fluted mounting.

The fixed shaft is hollowed out at its centre so that the internal driven shaft 17, itself hollow centrally to allow in this case passage of oil, can pass.

This shaft 17 is rotationally fixed to the hub 18 in the aforementioned manner, the internal bore of the hub 18 being fluted for this purpose.

This hub 18 constitutes a driven element associated with the locking clutch 4.

The second shell 7 has a sleeve 13 fitted onto the fixed shaft. The clutch 4 is axially disposed between the wall 6 and the turbine wheel 10 while being positioned at the external periphery of the said wheel 10 and of the casing 2.

The locking clutch 4, usually referred to as a "lock-up" clutch, has a torsion damper 20, a piston 21 mounted so as to be able to move axially with respect to the driven element 18, and at least one friction lining 24 associated with the piston 21 and able to be gripped between the said piston 21 and a counter-piston formed here by the wall 6, transverse overall, of the first shell 5.

The torsion damper 20 has an inlet part 40, an outlet part 60 (FIG. 1), 160 (FIG. 2), 260 (FIG. 8) and springs 50, 52, 53 interposed circumferentially between the said inlet parts 40 and outlet parts, in the form of webs 60, 160, 260 to join the latter together elastically.

The damper 20 thus has two coaxial parts 40–60, 160, 260 mounted so as to be able to move with respect to each other against circumferential-action springs 50, 52, 53.

The inlet part 40 is fixed to the piston 21, whereas the outlet part consists of a web fixed to the turbine wheel 10.

In FIG. 1 the web 60 is, economically, riveted at the same time as the turbine wheel 10 onto the flange 100 fixed to the hub 18 in this case by welding.

In FIG. 4 the outlet part is directly fixed, here by welding, to the turbine wheel 10, at the external periphery thereof.

The same applies in FIG. 8, the only difference being that in this FIG. 8 the outlet part 260 is fixed to the turbine wheel 10 by a circularly continuous portion directed towards the axis of the assembly, whereas in FIG. 4 the outlet part 160 is fixed to the turbine wheel by a circularly continuous portion directed radially in the opposite direction to the axis of the assembly.

In all cases the outlet part 60, 160, 260 has support sections 65, in the form of axially oriented support lugs, to support circumferentially the ends of the springs 50, 52, 53, the said lugs 65 being interposed between the circumferential ends of two consecutive springs 50, 52, 53, and directed towards the piston 21 and wall 6.

Here the inlet part of the torsion damper 20 consists of a plurality of guidance plates 40 attached fixedly to the piston 21 of the locking clutch 4. Each guidance plate has holding portions 41 to hold the springs 50, 52, 53 radially on the inside and, according to the invention, support sections 45, 145 to provide support directly to the facing circumferential ends of two consecutive springs 50, 52, 53. The piston 60, 160, 260 is provided at its external periphery with an axially orientated annular shoulder 28 shaped so as to retain the springs 50, 52, 53 on the outside.

Here the guidance plates 40 are metal, as is the piston and the other components of the hydrokinetic coupling mechanism 1.

These plates 40 form shims inserted between the facing ends of consecutive springs 50, 52, 53.

The support portions 45, 145 and the holding portions 41 consist of lugs as described hereinafter.

According to one characteristic the piston 21 is hardened at its external periphery, being for example carbonitrided for contact with the springs 50, 52, 53 in order to prevent wear on the said piston and incrustation of the said springs.

As is better seen in FIGS. 1, 4, 6 and 8 the annular shoulder 28 of the piston 21 is hollowed out internally at 61 to retain the springs 50, 52, 53 on the outside.

The shoulder 28 thus has a hollow 61 matching the external periphery of the said springs. The hollow 61 extends annularly in a continuous way and thus has in cross section the shape of an arc of a circle. The springs are thus allowed to enter the said hollow 61.

Figure 2:
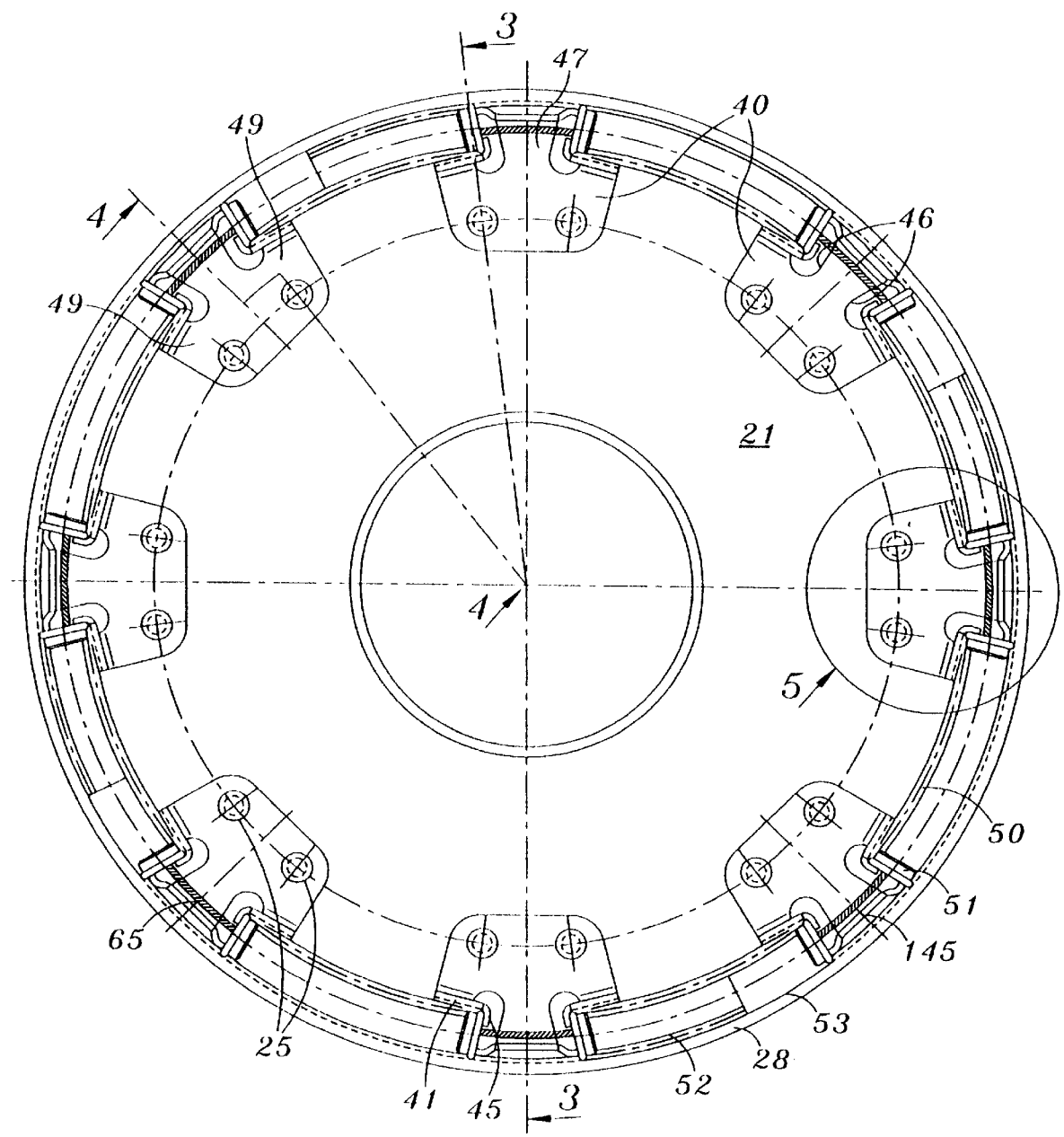
FIG. 2 is a view in elevation of a locking clutch according to the invention.
Figure 5:
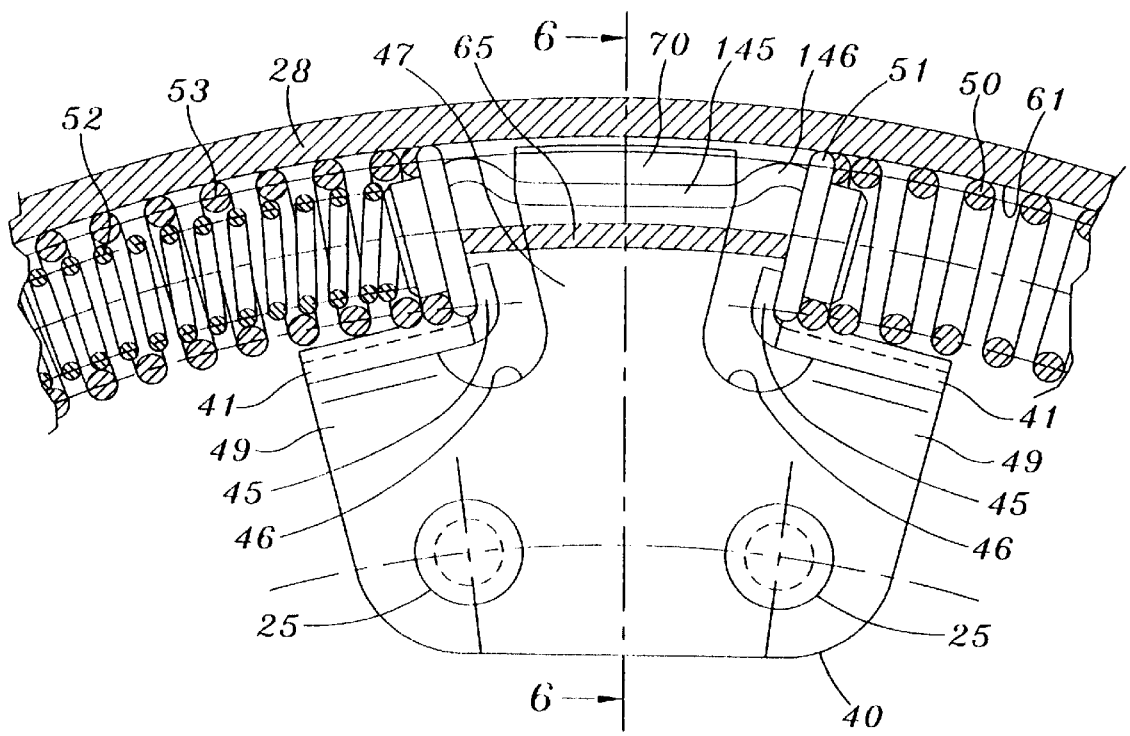
FIG. 5 is a view, to a larger scale, of the inset 5 in FIG. 2.

As can better be seen in FIGS. 2 and 5, the springs consist of a plurality of coil springs mounted between two consecutive guidance plates 40 and distributed at regular intervals circumferentially. Their number depends on the application. These springs are here pre-curved, but this is not necessarily the case.

More precisely, for good filtration of the vibrations, a spring 50 alternates circumferentially with a pair of springs 52, 53 mounted concentrically, the inner spring 52 being of shorter circumferential length than the spring 53 in order to form, in a manner known per se, an elastic end-of-travel stop, the said spring 52 bearing at one of its ends on a support plate 51, whereas there is a circumferential clearance between the other end of the spring 52 and the other plate 51 associated with the springs 53.

The coil springs 50, 53 therefore bear on the guidance plates 40 through plates 51 having a central stud to centre the springs.

The plates 51 bear on the support portions 145, 45 of the plates 40.

As can be seen in FIG. 5, each guidance plate 40 has according to the invention a central part 47 and two lateral wings 49, the said central part projecting radially towards the outside with respect to the lateral wings. This central part or portion 47 has on its external periphery a first axially oriented support lug 145 directed towards the turbine wheel 10, just like the radial shoulder 28. This axial lug 145 extends radially between the shoulder 28 and the support lugs 65 of the outlet part 60, 160, 260. The lugs 145 therefore extend above the lugs 65 facing these and have at each circumferential end a protrusion 146 for local bearing of the plate 51 and for retaining circumferentially the balancing plates 70 described hereinafter.

The lugs 145 belong therefore to the support portions and extend therefore parallel to the shoulder 28 and to the lugs 65, whilst being directed axially in the opposite direction with respect to the said support lugs 65.

Figure 3:
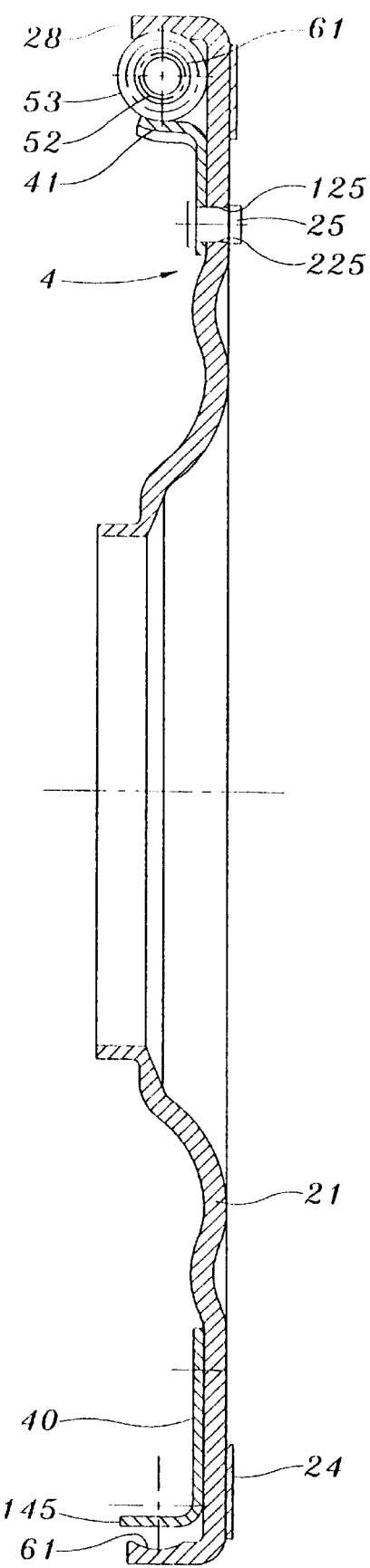
FIG. 3 is a view in section along the line 3—3 in FIG. 2.

The holding sections consist also of two holding lugs 41 of axial orientation overall and directed towards the turbine wheel 10. These lugs 41 have at their free end a curved shape to match the internal periphery of the spring (FIG. 3). These lugs 41, according to one characteristic of the invention, are extended, at the central part 47, by second support lugs 45 of transverse (or radial) orientation overall and directed radially overall towards the outside in the direction of the shoulder 28.

The first lugs 145 extend radially above the lugs 45.

Thus each wing 49 of the plates 40 has at its external periphery a portion in the shape of an angle bracket 41, 45 comprising its holding lug 41 extended by its transverse support lug 45. It will be appreciated that the plates 40 are symmetrical and have two portions in the shape of an angle bracket 41, 45 disposed on both sides of the first support lugs 45, overhanging the said portions.

The second lugs 45 form support portions for the internal edge of the plates 41, whereas the first axial lugs 145 form support portions 146 for the external edge of the plates 51. A cutout 46 separates the lugs 145 from the lugs 45, 41, so that the second support lugs 45, of radial orientation overall, extend so as to jut out with respect to the lugs 41. These lugs therefore carry the lugs 45.

Each plate 40 has therefore a simple shape and uses little material, for its central part 47 is inserted between the facing circumferential ends of two consecutive springs 50, 52, 53. The lateral wings 49 are allocated to each facing end of the said springs.

More precisely the plate 40 is initially (FIG. 6) plane and has holes 48 and cutouts 148 at the level of the part 47.

At 147 there can be seen a line intended to be cut as well as vertical and horizontal bending lines which have no reference numerals. To produce the plate, the ends of the part 47 are firstly stamped out to form the protrusions 146 with the cuts 147 being made, and bending to preform the lugs 45 and stamping to form the curved ends of the lugs 41. The central portion 47 and the peripheral portions of the wings 49 are then folded down to obtain finally the lugs 45, 41 and 145 and the cutout 46.

The plates are here attached to the piston 21 by riveting. To this end the piston 21 (FIG. 3) has passages 225 which coincide with the holes 125 made in the bottom part of the plates 40 for the passage of the rivet shafts 25.

It will be appreciated therefore that the lugs 41 are profiled and have a free end deformed (FIG. 3) to match the internal periphery of the springs 50, 52, 53.

This results from the fact that the external periphery of the lateral wings 49 of the plates 40 has an inclined shape (FIG. 6) initially.

Thus there exists radially a gap between the axial lugs 145 and the hollows 61. Profiting from this gap it becomes possible to insert balancing plates 70.

Figure 6:
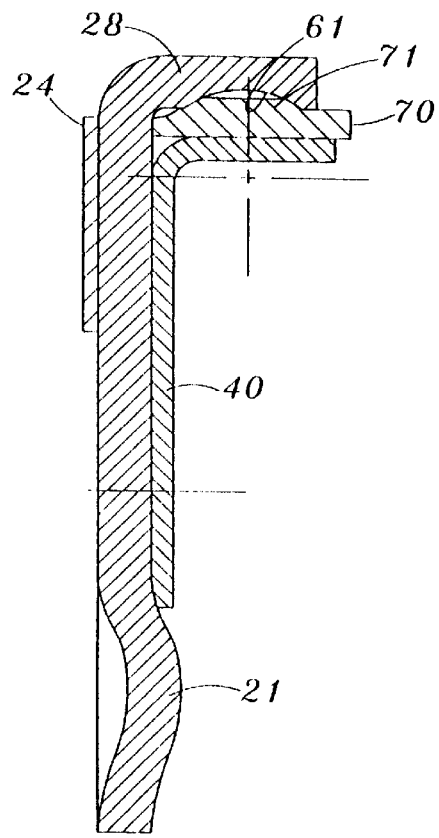
FIG. 6 is a view in section along the line 6—6 in FIG. 5.
Figure 7:
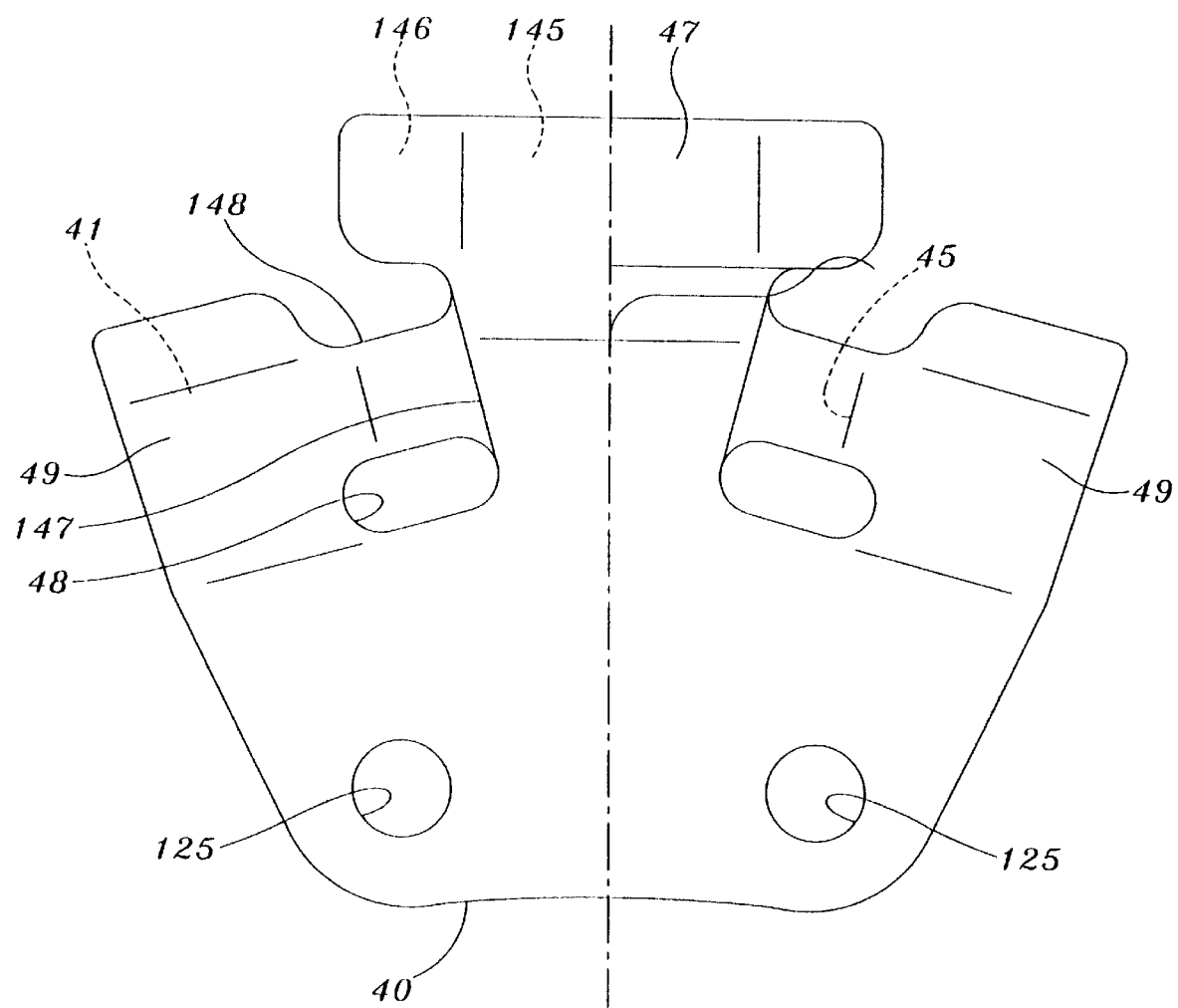
FIG. 7 is a view in elevation of a guidance plate before bending thereof.

FIG. 6 shows such a plate 70, which has at its external periphery a projecting zone 71, of trapezoidal shape overall, able to enter the hollow 61.

Each plate is intended to enter the space delimited by the protrusions 146 and it is for this reason that the main part of the lugs 145 is directed radially towards the centre with respect to the top of the protrusions 146, the radial distance between the said main part of the lugs 145 and the shoulder 28 being a function of the thickness of the plates 71.

Thus the plates 70 may be snap-fitted radially between the lugs 145 and the shoulder 28 at the desired place.

No drilling operation is therefore necessary to balance the locking clutch, the plates 70 being fixed by snap fitting. The plates 70 are also immobilised by the protrusions 146 and run no risk of escaping.

As a reminder, it should be stated that fluid chambers 22, 23 are formed on both sides of the piston 21, the support ring 101 interposed axially between the hub 18 and the wall 6 having, in a manner known per se, radial passages to establish communication of the oil circulating in the shaft 17 with the chamber 23.

In operation the turbine wheel 10 is driven by the impeller wheel 8 because of the circulation of fluid contained in the casing 2.

After starting of the vehicle the locking clutch 4, in order to avoid the phenomena of slip between the wheels 8, 10, connects the driven shaft with the driving shaft, in other words the driving element 2 is rotationally fixed to the driven element 18 by friction.

This is because, when, under the effect of the control hydraulic pressure prevailing in the chamber 22, the piston 21 grips the friction lining 24 between itself and the wall 26, the locking which results therefrom gives a direct driving, via the outlet part 60, 160, 260, of the shaft 17 by the casing 2 rotationally connected to the crankshaft.

In these figures the piston 21 is mounted so as to slide axially for this purpose on the external periphery of the hub 18.

To disengage the clutch the pressures prevailing in the chambers 22, 23 are reversed.

Naturally the friction lining 24, instead of being fixed, for example by adhesive bonding, to the piston 21 as in FIGS. 1 to 8, can as a variant be fixed to the wall 6.

Naturally the present invention is not limited to the example embodiment described. In particular the guidance plates 40 can be fixed to the piston 21 by welding.

The shoulder 28 can have a free end bent over by the centre to match the external periphery of the springs 50, 52, 53 and retain the latter radially.

Thus the shoulder 28 is curved instead of being hollowed as in the preceding figures. In this case, the main part of the lugs 145 must be shifted more towards the centre in order to be able to insert the plates 70.

Whatever the case it will be appreciated that the design of the locking clutch 4 is extremely simple.

We claim:

1. A locking clutch, for a hydrokinetic coupling mechanism (1) comprising: a casing (2) and a turbine wheel (10), of the type including a piston (21), a torsion damper (20) having an inlet part, consisting of a plurality of guidance plates (40) attached by fixing to the piston (21), and an outlet part (60, 160, 260) in the form of a web able to be fixed to the turbine wheel (10), in which the web has support portions (65), in the form of lugs, to provide a support to circumferential ends of springs (50, 52, 53) acting circumferentially between the inlet parts and outlet parts (60, 160, 260) mounted so as to be able to move with respect to each other counter to the springs, and in which the piston (21) is provided on an external periphery with an axially oriented annular shoulder (28) shaped so as to retain the springs (50, 52, 53), each guidance plate (40) has two lateral wings (49) and a central part (47) projecting radially with respect to the wings and inserted between the circumferential ends of two consecutive springs (50, 52, 53), each lateral wing (49) having a holding portion (41) to hold the springs (50, 52, 53) radially between the holding portion 41 and the annular shoulder 28, wherein the central part (47) has a first support portion (145) to provide support to the facing circumferential ends of the consecutive springs (50, 52, 53), each lateral wing (49) has a second support portion (45) extending its holding portion (41) to provide a support to the relevant circumferential end of the springs, and the first support portion (145) is offset radially outwardly with respect to the second support portions.

2. The clutch according to claim 1, wherein, the annular shoulder (29) of the piston (21) has a hollow (61) matching an external periphery of the springs.

3. The clutch according to claim 2, wherein, the hollow (61) extends annularly and has a cross section in the shape of an arc of a circle.

4. The clutch according to claim 1, wherein, the first support portions (145) comprise first support lugs formed at an external periphery of the central part (47) and extend radially between the shoulder (28) of the piston (21) and the support lugs (65) of the web (60, 160, 260).

5. The clutch according to claim 4, wherein, the second support portions (45) consist of lugs extending radially second support lugs (45) extending below the first support lugs (145).

6. The clutch according to claim 5, wherein, the first lugs (145) of the guidance plates (40) extend radially above the support lugs (65) of the web (60, 160, 260) and each have at a circumferential end a protrusion (146) to support a plate (51) interposed between the protrusion (146) and the springs (50, 52, 53).

7. The clutch according to claim 6, wherein, a balancing plate (70) is interposed between the first axial support lugs (145) and a hollow which the shoulder (28) of the piston (21) has for matching the external peripheries of the said springs.

8. The clutch according to claim 7, wherein, the balancing plate (70) has at an external periphery a projecting zone (71) able to enter the hollow (61).

9. The clutch according to claim 8, wherein, the balancing plates (70) are immobilized by the protrusions on the first support lugs (145).

10. A locking clutch, for a hydrokinetic coupling mechanism (1) comprising: a casing (2) and a turbine wheel (10), of the type including a piston (21), a torsion damper (20) having an inlet part (40), consisting of a plurality of guidance plates (40) attached by fixing to the piston (21), and an outlet part (60, 160, 260) in the form of a web able to be fixed to the turbine wheel (10), in which the web has support portions (65), in the form of lugs, to provide a support to circumferential ends of springs (50, 52, 53) acting circumferentially between the inlet parts (40) and outlet parts (60, 160, 260) mounted so as to be able to move with respect to each other counter to the springs, and in which the piston (21) is provided on an external periphery with an axially oriented annular shoulder (28) shaped so as to retain the springs (50, 52, 53), each guidance plate (40) has two lateral wings (49) and a central part (47) projecting radially with respect to the wings and inserted between the circumferential ends of two consecutive springs (50, 52, 53), each lateral wing (49) having a holding portion (41) to hold the springs (50, 52, 53) radially between the holding portion 41 and the annular shoulder 28, wherein the central part (47) has a first support portion (145) to provide support to the facing circumferential ends of the consecutive springs (50, 52, 53), each lateral wing (49) has a second support portion (45) extending its holding portion (41) to provide a support to the relevant circumferential end of the springs, and the first support portion (145) is offset radially, the first support portions (145) consist of the first axially oriented support lugs formed at the external periphery of the said central part (47) and extend radially between the shoulder (28) of the piston (21) and the support lugs (65) of the web (60, 160, 260), the second support portions (45) consist of lugs extending radially, the second support lugs (45) extending below the first support lugs (145); and the holding portions of the plates (40) consist of axially oriented holding lugs (41) which the lateral wings (49) of the plates (40) have at their external periphery so that each lateral wing (49) has at its external periphery a portion in the form of an angle bracket having its holding lug (41) extended by its support lug (45).

11. The clutch according to claim 10, wherein, the free ends of the holding lugs (41) are deformed so as to match the shape of the springs (50, 52, 53).

12. The clutch according to claim 11, wherein, the holding lugs (41) are extended by the second support lugs (45).

13. The clutch according to claim 12, wherein, a cutout (46) separates the first support lugs (145) from the holding lugs (41) and the second support lugs (45) of the wings (49) of the plates (40).

* * * * *